INVENTOR.
A. J. RADCLIFFE, JR.
BY
ATTORNEY $R = A\ \bar{N}_1\ \bar{N}_2\ \bar{N}_3$ $R = (A+R)\ \bar{N}_1\ \bar{N}_2\ \bar{N}_3$ United States Patent Office 3,385,975

Patented May 28, 1968

3,385,975

MAGNETIC LOGIC CIRCUITS HAVING A MAGNETIC AMPLIFIER CONFIGURATION

Arthur J. Radcliffe, Jr., Plymouth, Mich., assignor to International Telephone and Telegraph Corporation, New York, N.Y., a corporation of Maryland Continuation of application Ser. No. 813,141, May 14, 1959, now Patent No. 3,121,173, dated Feb. 11, 1964. This application Oct. 10, 1963, Ser. No. 315,167
13 Claims. (Cl. 307—88)

ABSTRACT OF THE DISCLOSURE

A saturable reactor used in a magnetic amplifier configuration is modified by capacitor storage, diode gates, feedback circuits, and the like, to provide logic circuits such as And gates, Or gates, Flip-Flops, Inhibit gates, and the like. When these logic circuits are interconnected, a resulting circuit may be made to perform any desired Boolian functions. The inventive circuit has special value in hostile environments.

This invention relates to logic circuits and more particularly to logic circuits using magnetic amplifiers. This is a continuation of my application entitled, "Logic Circuits," Ser. No. 813,141, filed May 14, 1959, and assigned to the assignee of this invention, now Patent Number 3,121,173.

Briefly, logic circuits are groups of electrical components interconnected to form standardized modules or building blocks which may be put together in any suitable combination to form a desired circuit. One type of logic circuit (called an "AND" gate) provides output signals only when a plurality of input signals coincide. Another type of logic circuit (called an "OR" gate) provides output signals when any one or more of a plurality of input signals are present. Still another logic circuit (called an "INHIBIT" gate) provides means for blocking signals under a specific condition. Yet another building block (called a "FLIP-FLOP") provides a memory function.

Usually logic circuit modules or building blocks have no immediate use in and of themselves. Primarily, these logic circuits are engineering aids which may be combined into an almost unlimited variety of circuits. In the past, logic circuits have featured electronic discharge devices such as tubes, transistors, and the like. However, each of these devices have certain drawbacks. For example, tubes have excessive power requirements and transistors have temperature and other environmental limitations.

Accordingly, an object of this invention is to provide new and improved logic circuits for use under widely varying temperatures.

In accordance with this invention, a magnetic amplifier having a core with a substantially square hysteresis loop characteristics is provided with reset and gate windings sequentially energized by the output of an AC generator, for example. During half-cycles of a first polarity in the output of the AC generator, the gate winding is energized to drive the core flux toward saturation of one magnetic polarity. During half-cycles of opposite polarity in the output of the AC generator, the reset winding is energized to drive core flux away from saturation in that one polarity. Certain input signals nullify the effects of the reset winding. Thereafter, the magnetic core is saturated in the one polarity responsive to a succession of half-cycles of the first polarity. Before the core is saturated, substantially all energy which the AC generator applies to the gate winding is utilized to drive the core flux toward magnetic saturation; therefore, the gate winding has a high DC impedance and little output current flows. After saturation, substantially no energy is dissipated in driving the core flux, the gate winding offers very little DC impedance, and a large output current flows. A relatively large capacitance is connected to the gate winding to give a smooth DC output potential, since the output current flows only during half-cycles of one polarity.

A memory function is provided by feeding back a part of the filtered DC output to simulate an input signal, thus maintaining the output signal indefinitely. In this manner, the magnetic amplifier "flips" to "remember" the occurrence of an input signal. Later, a third or inhibit winding is energized causing the amplifier to "flop" and "forget" the original input signal while "remembering" the inhibit signal.

The above mentioned and other objects of this invention together with the manner of obtaining them will become more apparent and the invention itself will be best understood by making reference to the following description of an embodiment of the invention taken in conjunction with the accompanying drawings in which.

Figures 1, 1A, 1B, 1C, 2:
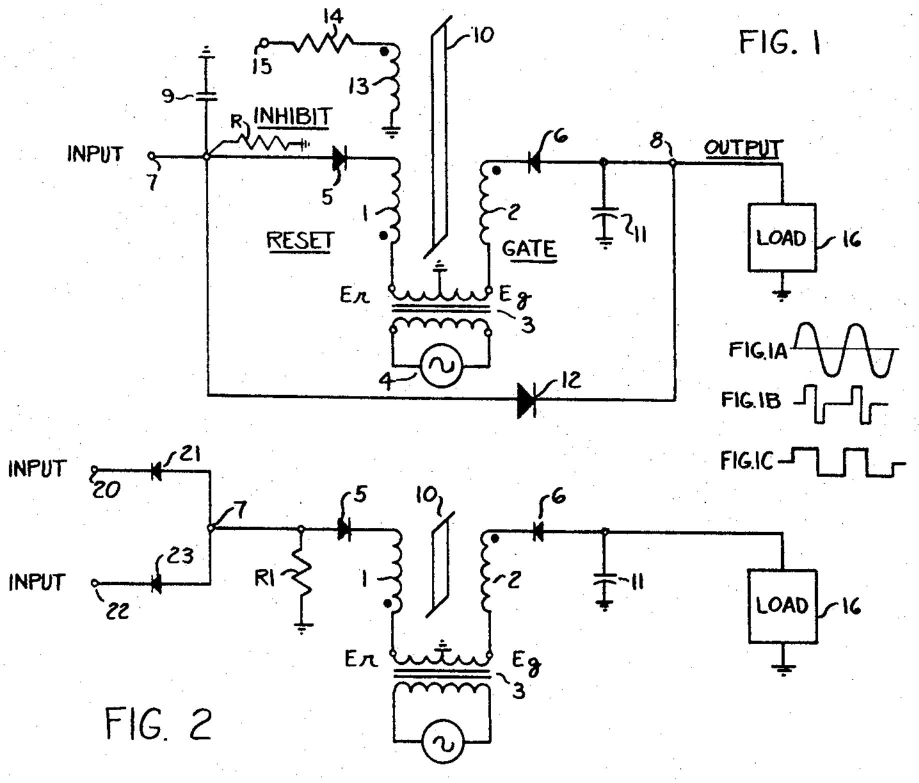
FIG. 1 illustrates the concepts of a magnetic amplifier adapted to provide the basic elements of a logic circuit.
FIGS. 1A, 1B and 1C illustrate optional outputs of generator 4.
FIG. 2 illustrates a manner in which a plurality of electrically isolated input terminals may be provided to make gating circuits.

Each of the circuits shown in FIGS. 5–8 includes three parts. For example, FIG. 5A illustrates how circuit components may be assembled to provide desired functions. FIG. 5B is a logic diagram in which the functions of FIG. 5A are represented graphically by standard logic symbols. A Boolian algebra formula is also given to identify the logic functions, i.e. an output signal appears at terminal R if an input signal is applied at terminal A, and no signal is applied at terminals N1, N2, or N3.

*Brief description*

FIGS. 1–4 illustrate the basic concepts used to provide the logic circuits. The pedagogics of these figures is to explain the basic concepts in a step-by-step manner with each succeeding figure advancing an understanding of the technical principles involved.

Briefly, the basic circuit element is the magnetic core 10 having a substantially square hysteresis loop having a plurality of windings associated therewith. Dots near an end of each winding indicates the polarity thereof. Gate winding 2 is adapted to drive the flux of core 10 toward saturation of one magnetic polarity. Reset winding 1 and inhibit winding 13 are adapted to counteract the effects of winding 2 by driving the flux of core 10 away from saturation in the one magnetic polarity.

An AC generator 4 provides alternating half-cycles which serve as a periodically reversing biasing potential. Half-cycles of one polarity (designated E*g*) energize gate winding 2 and half-cycles of reverse polarity (designated E*r*) energize reset winding 1. The circuit values and the frequency of generator 4 are such that a half-cycle of gating current E*g* does not provide enough magnetic effects to switch core 10 from its first or unsaturated (with respect to the one magnetic polarity) state to its second or saturated state. However, the cumulative effects of gating current E*g* are such that two half-cycles cause core 10 to switch from its unsaturated to its saturated condition unless reset current E*r* is applied during alternate half-cycles. Winding 1 is provided with a sufficient number of turns to cause core 10 to switch from its saturated to its unsaturated (with respect to the one magnetic polarity) condition in a single half-cycle of energizing current.

Means are provided for reducing the size of the magnetic core by limiting the volt second product of the output of generator 4. The important thing about generator 4 is that it provides periodically changing control voltage polarities. A sine wave may be used as shown in FIG. 1A; however, the excessive volt seconds in each half-cycle require the use of a needlessly large core. The same results may be had if the output signal of generator 4 is limited or reduced to a minimum by the use of pulses of a restricted duration as shown in FIG. 1B, thereby permitting the use of small cores. No specific durations or amplitudes are implied for the waveform 1B; although, in any specific system, certain relationships regarding amplitude, duration and the properties of windings 1 and 2 exist for best performance.

*Detailed description*

Generator 4 develops a biasing voltage which is periodically applied across transformer 3 to the reset and gate windings 1 and 2. During a first half-cycle, reset voltage E*r* may be of negative polarity, in which case the gating voltage E*g* is of positive polarity. During the second half-cycle, reset voltage E*r* is of positive polarity, and gating voltage E*g* is of negative polarity. Diodes 5 and 6 are poled oppositely so that current can not flow simultaneously in both winding 1 and winding 2. Thus, at the instant when reset voltage E*r* is of a negative polarity, current flows through diode 5 and winding 1. At the same instant, gating voltage E*g* is of positive polarity, and no current flows through either diode 6 or winding 2. Since current does not flow in winding 2, there is no output current to load 16. During the following half-cycle, reset voltage E*r* is positive, no current flows through diode 5 and winding 1, gating voltage E*g* is negative, and current does flow through diode 6 and winding 2.

At an instant, it may be assumed that core 10 is in its non-saturated state with respect to one magnetic polarity. Reset voltage E*r* is assumed to be positive; therefore, no current flows through winding 1 and diode 5. Gate voltage E*g* is negative and current does flow through winding 2 and diode 6. Responsive to the current through the winding 2, the flux in core 10 is driven toward saturation in the one magnetic polarity. However, in the single half-cycle being described, core 10 can not reach its second or saturated state. Also during the half-cycle being described, winding 2 offers relatively great DC resistance to current flow. Thus substantially all of the energy that is introduced through transformer 3 is absorbed across winding 2 and none across load 16. When the half-cycle being described terminates, core 10 remains in the state of partial magnetic saturation to which it has been driven.

When the control current from generator 4 reaches the next half-cycle, reset voltage E*r* is negative and gate voltage E*g* is positive. Current flows through diode 5 and winding 1 while diode 6 blocks current flow in winding 2. Since opposite magnetic effects are produced by windings 1 and 2, the flux in core 10 is driven away from the partial saturation in the one magnetic polarity. Therefore, core 10 is now biased toward its unsaturated condition with respect to the one magnetic polarity.

The following and every succeeding cycle repeats the process. First, core 10 is biased toward saturation by current which flows in winding 2. Then it is biased away from saturation by current which flows in winding 1.

Next, assume that an input voltage is applied at point 7 with a potential which is more negative than the potential of reset voltage E*r*, thus back biasing diode 5. Capacitor 9 stores and smooths this input signal, as required, to insure a coincidence of input and reset signals by, in effect, spreading the period of time during which the input signal appears. Resistance R provides a path for discharging capacitor 9 before the occurrence of a complete cycle in the output of generator 4.

Under these assumed conditions, no current flows in winding 1 due to the blocking effect of the back biased diode 5. The magnetic effects caused by energization of gate winding 2, are not overcome on the next half-cycle. Therefore, core 10 remains biased toward, but not in a condition of saturation in the one magnetic polarity. When current flows through gate winding 2 on the next half-cycle after the reset voltage is blocked by an input signal, the flux of core 10 is again driven toward saturation in the one magnetic polarity. The magnetic effects are cumulative, and after the volt-second contents of a sufficient number of half-cycles are integrated, the flux of core 10 is driven to full saturation in the one magnetic polarity. Then, the effective DC resistance of winding 2 falls from a relatively high value to an extremely low value, and energy from generator 4 reaches the load 16.

The input signal appearing at terminal 7 may be quite long or may be a momentary pulse. However, as long as the input signal remains at point 7, reset voltage E*r* is ineffective, winding 2 offers substantially no DC resistance, and current is delivered to load 16 during each half-cycle in the output of generator 4 which may be conducted through diode 6. Hence, the output of the magnetic amplifier is pulsating DC. Such a pulsating output may be desirable in some circuits. However, in these logic circuits, it is more desirable to provide a smooth DC output. Therefore, a relatively large capacitor 11 is connected to filter the output.

One of the basic building blocks in logic systems is a memory device or "FLIP-FLOP" circuit. One input signal turns the circuit "on," and a second input signal turns the circuit "off." To provide a "FLIP-FLOP" circuit, a small portion of the rectified half-cycle output signal fed through winding 2 to load 16 is bled-off at point 8 and fed-back through diode 12 to input 7. This feedback is a locking potential which back biases the diode 5 and prevents the reset voltage E*r* from energizing winding 1. Thus, core 10 remains in its saturated condition and output current continues to be delivered to load 16 without regard to the continuation of the original input signal at point 7. To return the FLIP-FLOP to its original state, a suitable signal may be applied at point 15, thus energizing winding 13 to demagnetize core 10 with respect to the one magnetic polarity. Thereafter, if no input signal is applied at point 7, the circuit returns to its quiescent operation and substantially no current flows through winding 2 to load 16.

FIG. 2 discloses how gate circuits may be made by providing a plurality of electrically isolated inputs. Briefly, the amplifier of FIG. 2 is the same as the amplifier of FIG. 1 except that there is no inhibit winding and no memory feedback through diode 12. While an inhibit winding is necessary to turn off a flip flop it still may be employed in a logic circuit to force reset. Here the path for reset current extends from ground through the center tap of the upper winding of transformer 3 (where energy from generator 4 is introduced by a transformer action) winding 1, diode 5 and resistor R1 to ground. Resistor R1 is provided first to help reduce power consumption by eliminating the need for energizing a preceding circuit, second, to allow full use of all power in the input signal. It has been found that resistor R1 may be replaced by a diode or by a winding, as required.

If a signal is applied at either point 20 or point 22, the diode 5 is back biased, and reset current is effectively blocked. Removal of an input signal from point 20, without removal of an input signal from point 22 (and vice versa) does not have any effect. It is only when input signals are simultaneously removed from both of the input terminals 20 and 22 that the magnetic amplifier of FIG. 2 is turned "off." Therefore, the embodiment of FIG. 2 provides an "OR" gate.

Diodes 21 and 23 are provided to isolate the "OR" gate input signals from each other. It is not possible for a direct current to flow from point 20 through diode 21 and diode 23 to point 22 because current which is passed by diode 21 is not passed by diode 23. On the other hand, input signals of the same polarity applied to either point 20 or 22 are passed through the diodes 21, 23 to point 7.

Figure 3:
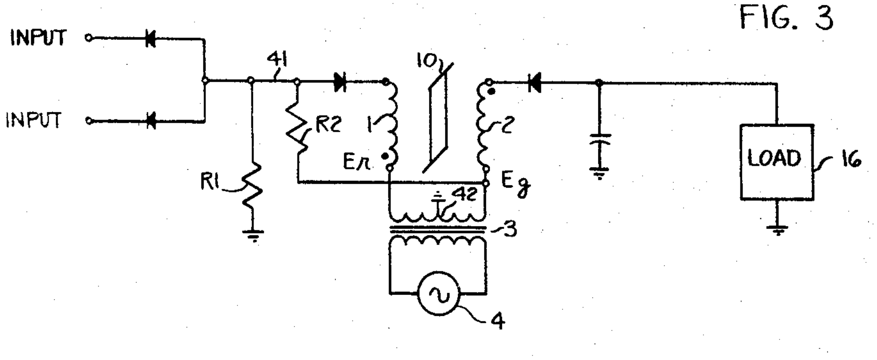
FIG. 3 shows a manner in which the magnetic amplifier may be modified to provide a more efficient control or reset circuit.
Figure 4:
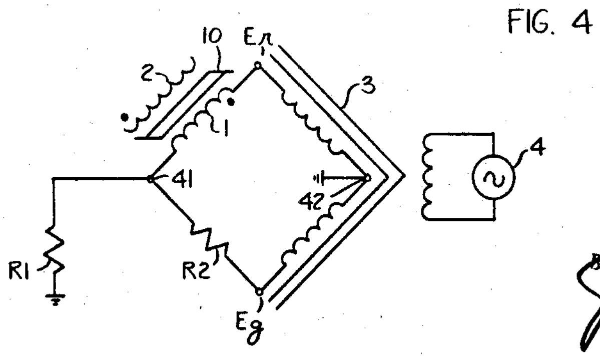
FIG. 4 is a redrawing of FIG. 3 in the configuration of a balanced bridge circuit to facilitate an understanding of the improved efficiency of the circuit.

FIG. 3 shows a magnetic amplifier having increased reset efficiency (FIG. 4 is a redrawing of a portion of FIG. 3). Feedback resistor R2 is provided to introduce bias in a balanced bridge during the half-cycles when gating voltage E*g* is effective. That is, a balanced bridge circuit is provided wherein two arms of the bridge are the two halves of the secondary winding of transformer 3. One arm of the bridge is reset winding 1 and the other arm of the bridge is a control means in the form of resistor R2. When the bridge is in balance, a zero potential difference appears between points 41 and 42. Hence, all of the reset voltage E*r* is forced through winding 1. Resistor R1 is not required if the bridge is in perfect balance. However, since perfect balance is not possible, any potentials appearing at point 41 are connected to ground through resistor R1.

The following is a description of a few typical applications illustrating how the principles described above may be used to provide a wide variety of more sophisticated circuits. Those skilled in the art will readily perceive any number of other combinations for meeting other needs. The same reference numerals identify corresponding parts in all figures.

Figures 5A, 5B, 6A, 6B:
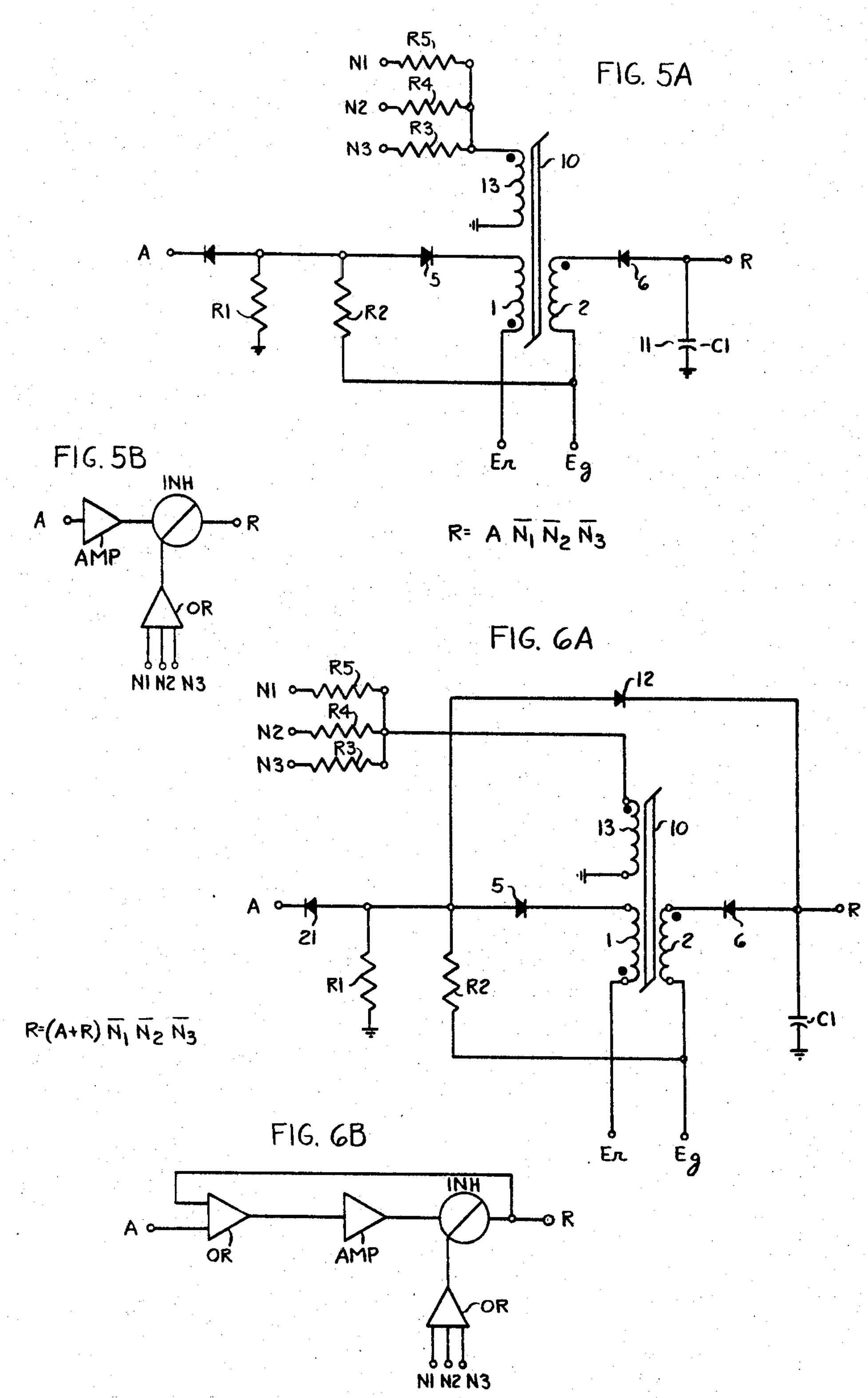
FIGS. 5–8 are examples illustrating the manner in which the basic concepts illustrated in FIGS. 1–4 may be combined to provide complete circuits.

FIG. 5A illustrates a circuit similar to that shown in FIG. 3, plus an inhibit winding 13. During quiescent periods, a signal source applies voltages E*r* and E*g* of alternate polarity to reset and gate windings 1 and 2 respectively. If a signal is applied to any of the terminals N1, N2, or N3, inhibit winding 13 is energized to prevent core 10 from saturating in the one magnetic direction despite any appearance of a signal at terminal A. As indicated by FIG. 5B, the magnetic amplifier conducts if a signal is applied at terminal A and not at any of the three "OR" gate inputs. The circle marked "INH" indicates inhibit means such as winding 13 and the diameter line is slanted to indicate that it is the output of the amplifier which is blocked.

FIG. 6A illustrates a "FLIP-FLOP" with a three input "OR" gate inhibitor. Here an output is delivered to terminal R when an input signal is applied at either of the terminals A or R and not at any of the inhibit terminals. When a signal is applied at input terminal A, the reset voltage E*r* is blocked and does not counteract the magnetic bias resulting from the preceding half-cycle. On the next half cycle, winding 2 conducts to saturate core 10 and deliver an output current to terminal R. Thereafter, feedback through diode 12 maintains a blocking potential on the left side of diode 5. This prevents the reset winding from demagnetizing core 10 with respect to the given polarity. Thus, the circuit continues to deliver output current at terminal R until an inhibiting signal appears on any of the terminals N1–N3 at which time current flows in winding 13 to drive the core 10 away from saturation. Since diodes 12 and 21 are biased in the same effective direction relative to the reset winding 1, an input signal at terminal R has the same effect as a signal at terminal A.

A comparison of the logic diagrams of FIGS. 5B and 6B illustrates how the same basic circuit may be modified by an additional element to provide additional features. For example, both FIGS. 5B and 6B show an amplifier with a three input "OR" gate inhibitor. If a similar device is required in connection with a "FLIP-FLOP," it is only necessary to connect the feedback circuit including diode 12 to form an input "OR" gate.

Figures 7A, 7B, 8A, 8B:
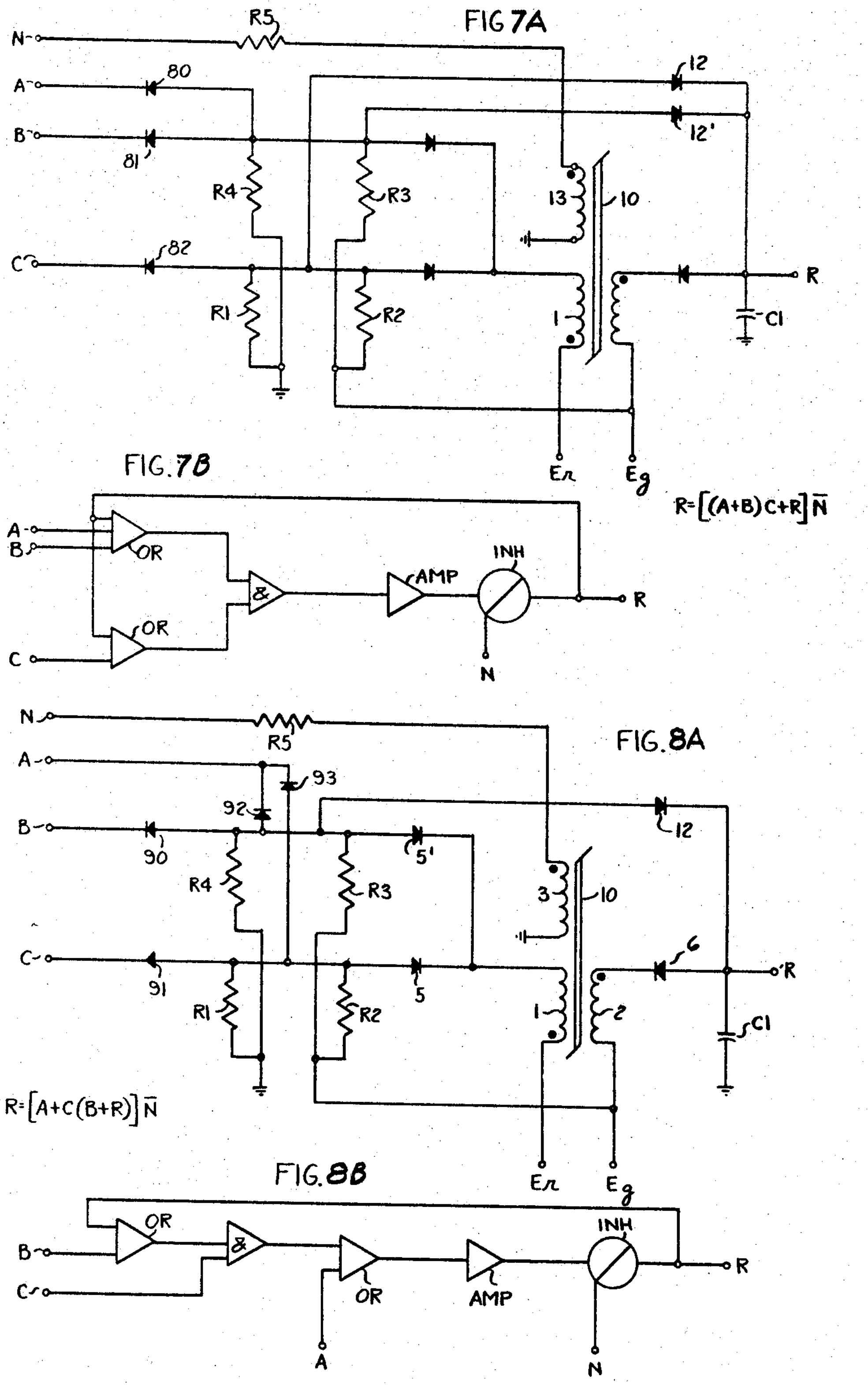

FIG. 7 is a combination of "AND" gates and "OR" gates as logically shown in FIG. 7B. Here a signal must be applied to both of the terminals B and C if current in reset winding 1 is to be blocked. This provides an "AND" gate. Terminal A is equivalent to terminal B and, therefore, provides an "OR" gate preceding the "AND" gate. Diodes 12 and 12′ are poled in the same direction as input diodes 80–82 (relative to the reset winding 1) to provide the feedback which forms a "FLIP-FLOP" circuit. As in previously described circuits, an application of a potential to terminal N inhibits the output of the magnetic amplifier.

FIG. 8 illustrates a cascaded combination of an "OR" gate, an "AND" gate, an "OR" gate, and amplifier and inhibitor. If a blocking signal is applied to terminal C, a by-pass circuit for reset voltage E*r* may be traced through diode 5′ and resistor R4 to ground. Similarly, a signal applied to terminal B does not prevent a flow of reset current through diode 5. Therefore, both terminals B and C must have input signals applied thereto if the amplifier is to supply an output signal. Hence, terminals B and C comprise an "AND" gate. Once output current begins to flow through winding 2 and terminal R, feedback through diode 12 maintains conductivity to provide a "FLIP-FLOP" circuit. The inhibit winding 3 has a demagnetizing effect (with respect to the one magnetic polarity) so that an application of a signal to terminal N turns the amplifier "off". Terminal A provides an "OR" gate to permit a control which is alternative to that of the "AND" gate, i.e. a signal at terminal A is applied through diodes 92 and 93 to block reset current without regard to any signals which then may be applied to terminals B and C.

While the principles of the invention have been described in connection with the specific apparatus, it is to be clearly understood that this description is made only by way of example and not as a limitation on the scope of the invention.

I claim:

1. An electrical device comprising a square loop magnetic core having a plurality of windings associated therewith, means for sequentially and alternately energizing two of said windings, one of said two windings driving core flux toward saturation in one magnetic direction, the other of said two windings driving core flux away from saturation in said one magnetic direction, means responsive to an input signal for blocking the effect on core flux when said other winding is energized, whereby said core flux is driven to saturation responsive to repeated energizations of said one winding, means responsive to saturation of said core for feeding back a signal to hold said core in saturation, and means comprising another of said windings for driving said core flux away from saturation.

2. In an electrical logic circuit, a magnetic device having substantially square hysteresis loop characteristics, at least two windings associated with said magnetic device, means for providing biasing potential of periodically reversing polarity, a plurality of unidirectional means for conducting current of only one polarity, means for connecting one end of the first of said windings to one of said unidirectional means, means for applying said biasing potential to the other end of said first winding, means for connecting one end of the second of said windings to another of said unidirectional means, means for applying said biasing potential to the other end of said second winding, means for applying input signals to said one unidirectional means, filter means connecting to said other unidirectional means, and means coupling said filter means to apply a feedback signal to said one unidirectional means to provide a locking potential for giving a flip-flop action.

3. The electrical logic circuit of claim 2 wherein said one unidirectional means is poled to conduct one polarity of said biasing potential and said other unidirectional means is poled to conduct the other polarity of said biasing potential.

4. The electrical logic circuit of claim 2 and means for interconnecting components of said logic circuits in a balanced bridge configuration whereby said first winding comprises a first arm of said bridge, said means for providing biasing potential comprises second and third arms of said bridge, and control means connected in a fourth arm of said bridge to provide a balanced bridge.

5. The electrical logic circuit of claim 2 and a plurality of input terminals, means for electrically isolating said input terminals thereby providing an "OR" gate for coupling a plurality of sources of input signals to said one unidirectional means.

6. The electrical logic circuit of claim 5 and means connected between said one unidirectional means and said isolated input means for conducting said biasing potential thereby providing a path for energizing said first winding.

7. A magnetic amplifier comprising at least two windings associated with a magnetic core, a pair of interconnected transformer windings, means for cyclically applying biasing potential through said transformer windings to said two windings, means for connecting one end of a first of said two windings to a free end of said interconnected transformer windings, control means for connecting the other end of said first winding to the other free end of said interconnected transformer windings, means whereby said first winding, said interconnected windings, and said control means complete a balanced bridge, means for applying input signals to the first of said two windings to prevent the flow of current responsive to said biasing potential through said first winding.

8. In a magnetic amplifier, means comprising a magnetic core having two stable states of saturation, supply means for providing alternating voltage having first and second half-cycles, means responsive to said first half-cycles for providing magnetizing effects to bias said core toward a first of said states of saturation, means responsive to said second half-cycles for reducing said magnetizing effects produced during said first half-cycles thereby biasing said core toward a second of said states of saturation, control means for changing the magnetizing effects of said second half cycles, means rendered operative responsive to last said named means for filtering said first half-cycles to provide a substantially smooth D.C. signal, and means responsive to said D.C. signal for maintaining said changed magnetizing effects, and means for thereafter feeding back a signal to the first of said two windings for a continuous prevention of said current flow into said first winding.

9. The magnetic amplifier of claim 8 and means comprising a plurality of terminals for inhibiting said amplifier, and means for rendering said inhibiting means effective responsive to signals applied to any of said terminals.

10. The magnetic amplifier of claim 8 wherein said means responsive to said second half-cycles is connected as a first arm of a balanced bridge, said means for providing said alternating voltage is connected as second and third arms of said balanced bridge and means comprising a resistor connected as the fourth arm of said balanced bridge.

11. The magnetic amplifier of claim 8 wherein said control means comprises an "OR" gate having a plurality of input terminals, and means responsive to signals applied to at least one of said input terminals for feeding back at least a portion of said filtered half-cycles through another of said "OR" gate input terminals thereby maintaining conductivity.

12. The magnetic amplifier of claim 8 and feedback means for applying to said control means a signal derived from said filtered first half-cycles.

13. The magnetic amplifier of claim 12 wherein said feedback means comprises unidirectional current control means for isolating said control means from said feedback means.

References Cited

UNITED STATES PATENTS 2,871,442 11/1959 Perkins ----------- 307—88 X

BERNARD KONICK, *Primary Examiner.*

S. URYNOWICZ, *Assistant Examiner.*